(12) United States Patent
Durand

(10) Patent No.: US 12,738,720 B2
(45) Date of Patent: Sep. 15, 2026

(54) METHOD FOR SEALING A JUNCTION HAVING A CONTACT SURFACE AND A COUNTER-CONTACT SURFACE OF AN ELEMENT OF A COMPARTMENT OF A GAS-INSULATED SUBSTATION, AND RESULTING JUNCTION

(71) Applicant: RTE RESEAU DE TRANSPORT D'ELECTRICITE, Paris la Défense Cedex (FR)

(72) Inventor: Fabrice Durand, Bron (FR)

(73) Assignee: RTE RESEAU DE TRANSPORT D'ELECTRICITE, Paris la Defense Cedex (FR)

( * ) Notice: Subject to any disclaimer, the term of this patent is extended or adjusted under 35 U.S.C. 154(b) by 218 days.

(21) Appl. No.: 18/708,468

(22) PCT Filed: Nov. 24, 2022

(86) PCT No.: PCT/IB2022/061385
§ 371 (c)(1),
(2) Date: May 8, 2024

(87) PCT Pub. No.: WO2023/095051
PCT Pub. Date: Jun. 1, 2023

(65) Prior Publication Data

US 2025/0038495 A1 Jan. 30, 2025

(30) Foreign Application Priority Data

Nov. 29, 2021 (EP) .................................... 21306657

(51) Int. Cl.
*F16L 23/16* (2006.01)
*H02B 13/045* (2006.01)

(52) U.S. Cl.
CPC .......... *H02B 13/045* (2013.01); *F16L 23/165* (2013.01)

(58) Field of Classification Search
CPC ....... F16L 23/165; F16L 23/16; H02B 13/045
(Continued)

(56) References Cited

U.S. PATENT DOCUMENTS 3,066,823 A 12/1962 Baker

FOREIGN PATENT DOCUMENTS

CN 102842863 A * 12/2012 ........... H02B 14/045
EP 0 090 436 A2 10/1983
(Continued)

OTHER PUBLICATIONS

International Search Report as issued in International Patent Application No. PCT/IB2022/061385, dated Jan. 19, 2023.

*Primary Examiner* — Timothy J Thompson
*Assistant Examiner* — Guillermo J Egoavil
(74) *Attorney, Agent, or Firm* — CUSHMAN PARTNERS, LLC

(57) ABSTRACT

A method for sealing a junction with a contact surface and counter-contact surface of an element of a compartment of a gas-insulated substation includes injecting a sealing product into an inter-seal volume formed between the contact surface and counter-contact surface by using a leakage recovery duct opening into the inter-seal volume. Prior to injection, a vent duct different from the leakage recovery duct is drilled from the outside of the compartment into the inter-seal volume. During injection, the sealing product is injected under pressure into the inter-seal volume until it fills it, then exits through the vent duct.

16 Claims, 7 Drawing Sheets

Figure 1:
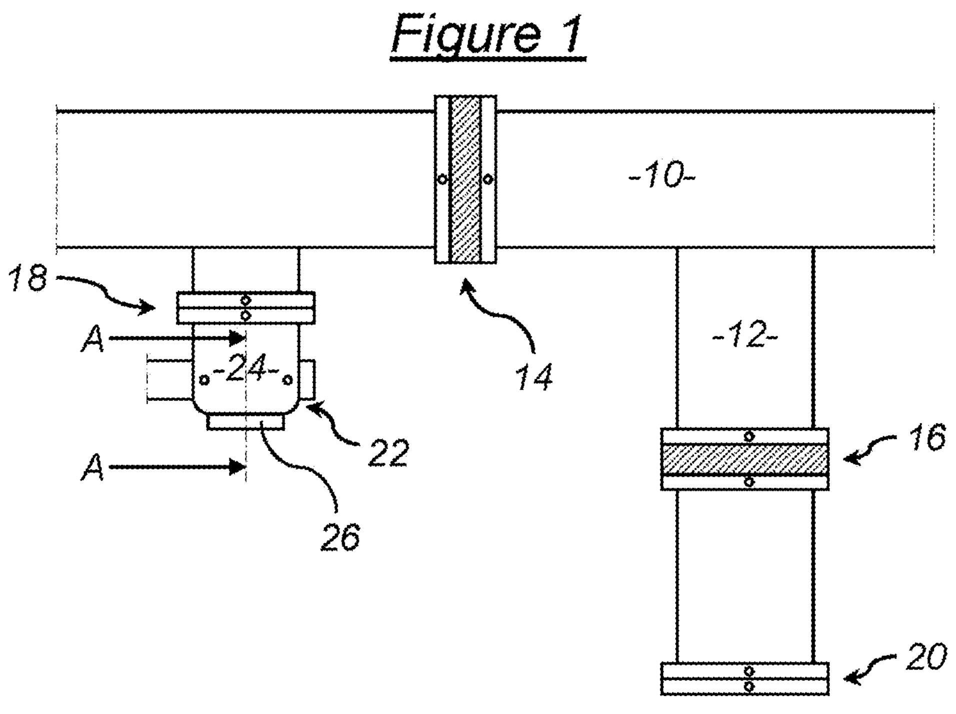

(58) Field of Classification Search
USPC .......................................................... 174/50
See application file for complete search history.

(56) References Cited

FOREIGN PATENT DOCUMENTS

| | | | | |
|---|---|---|---|---|
| FR | 2 489 918 | A1 | 3/1982 | |
| KR | 200214446 | Y1 * | 2/2001 | ............ B60R 27/00 |
| KR | 10-0988068 | B1 | 10/2010 | |

* cited by examiner

-10-
-12-
18
A
-24-
A
14
22
26
16
20

34
24 (A-A)
36
B
B
38
26
30
32
28
30

80
78
76
60
-56-
P
58
82
84

METHOD FOR SEALING A JUNCTION HAVING A CONTACT SURFACE AND A COUNTER-CONTACT SURFACE OF AN ELEMENT OF A COMPARTMENT OF A GAS-INSULATED SUBSTATION, AND RESULTING JUNCTION

CROSS-REFERENCE TO RELATED APPLICATIONS

This application is the U.S. National Stage of PCT/IB2022/061385, filed Nov. 24, 2022, which in turn claims priority to European patent application number 21306657.4 filed Nov. 29, 2021. The content of these applications are incorporated herein by reference in their entireties.

The present invention relates to a method for sealing a junction having a contact surface and a counter-contact surface of an element of a compartment of a gas-insulated substation. It also relates to a junction having a contact surface and counter-contact surface resulting from such sealing.

In the context of a compartment element in a GIS (for "Gas-Insulated Substation"), it is generally sulfur hexafluoride or $SF_6$ that is at risk of leaking, since this gas circulates under pressure in the compartment as a high-performance electrical and possibly thermal insulator. Although this gas is non-toxic and, a priori, harmless to humans, it is a greenhouse gas whose global warming potential is 22,800 times greater than that of carbon dioxide. Its consumption also has a cost. It is therefore important to prevent or avoid any leakage of such a gas into the atmosphere.

In complex GIS compartment elements with portions connected to each other or to limit devices, the connections are made using flange and counter-flange junctions, shaft and bore junctions, rupture discs, density monitoring devices, insulating wafers between flanges, mechanical seals, and constitute the weak points from which leaks are most likely to occur, especially when the gas is present under pressure in the compartment. But when leaks are light, diffuse and the gas is difficult to detect because it is colorless or odorless, they are often difficult or impossible to locate precisely.

Furthermore, sealing such leaks while keeping the GIS compartment wherein they occur under pressure and voltage for live-line working is often a delicate operation. Dismantling the assemblies in order to revise the bearing surfaces and change the mechanical seals is generally out of the question, even though this would be the ideal solution. Pipes and other GIS compartment elements are particularly delicate and time-consuming to dismantle. There is also the problem of unavailability of the entire structure, and in particular of a portion of the power transmission network that uses such GIS compartments when they have to be dismantled, which causes major inconvenience in terms of operations. For this reason, it is necessary to offer sealing solutions that do not require dismantling or operating interruption.

Several methods are mainly known for solving, at least temporarily, gas leakage problems on flanged junctions of GIS compartment pipelines without interrupting their operation, in particular by maintaining the gas pressure and electrical voltage therein.

According to a first method, a strip of fabric, for example of resin-impregnated glass fabric, is wound over the flanged junction and in its vicinity on either side of the junction to form a tourniquet. This method of external sealing appears simple, but presents a difficulty in installation under pressure. In addition, the surface condition of the flanged junction must be prepared to facilitate adhesion of the strip. It also prevents the flanged junction from being accessed at a later date, and prevents it from being dismantled. Finally, such a sealing must withstand the pressure of the leaking gas, and is generally not durable.

According to a second method for external sealing, an enclosure is created around the flange junction by means of a hermetic shuttering, this enclosure thus constituting a leakage recovery device arranged downstream of the leakage zone, and a polymerizable liquid resin, a pressurized gas or a preformed seal is optionally injected into it through an opening provided for this purpose. Not only can the hermetic shuttering be heavy and cumbersome, or even impossible to install due to support, tie rod or framing constraints, but the gas leakage also remains confined in an enclosure at a pressure at least equal to that inside the pipe. A sealing of this type is therefore difficult to maintain over time. Moreover, if the enclosure is filled with polymerizable resin, all subsequent access to the flanged junction is prevented.

According to a third method, a sealing product is injected between the flanges of the junction. More precisely, a flange is perforated and the product is injected at the level of the insulating wafer. The product is supposed to go around the flange, filling any gaps and stopping the leakage by forming a new sealing. Several embodiments of this method for internal sealing are for example taught in patent document FR 2 489 918, in a more general context than that of GIS compartments. According to this document, it requires machining specifically designed for injection, but has the advantage of being able to take advantage of the presence of a leakage recovery duct in at least one of the flanges of the pipe junction to carry out the injection.

According to the general principles of this third method, the invention applies more particularly to a method for sealing a junction with a contact surface and counter-contact surface of an element of a compartment of a gas-insulated substation, this junction comprising two mechanical seals clamped between the contact surface and the counter-contact surface, arranged so as to form a closed inter-seal volume delimited by both of the mechanical seals and by the contact surface and counter-contact surface, the method for sealing comprising the injection of a sealing product into the inter-seal volume by use of a leakage recovery duct arranged in the thickness of the compartment, this duct opening into the inter-seal volume.

However, for such a sealing to be complete and stable over time, the pre-existing gas in the inter-seal volume must be completely expelled and replaced by the sealing product. However, the method described in FR 2 489 918 does not provide for this, nor does it enable it to be done simply and efficiently. Gaseous bubbles are almost certain to remain in the inter-seal volume after the sealing product has been injected.

It may therefore be desirable to provide a method for sealing a junction with a contact surface and counter-contact surface which enables at least some of the above-mentioned problems and constraints to be overcome.

A method is therefore proposed for sealing a junction with a contact surface and counter-contact surface of an element of a compartment of a gas-insulated substation, this junction comprising two mechanical seals clamped between the contact surface and the counter-contact surface, arranged so as to form a closed inter-seal volume delimited by both of the mechanical seals and by the contact surface and counter-contact surface, the method for sealing comprising an injection of a sealing product into the inter-seal volume by using a leakage recovery duct arranged in the thickness of the compartment, this duct opening into the inter-seal volume, wherein:

prior to injection, the method for sealing involves drilling a vent duct different from the leakage recovery duct from the outside of the compartment to the inter-seal volume; and during injection, the sealing product is injected under pressure into the inter-seal volume until it fills it, then exits through the vent duct.

In this way, pre-drilling a vent pipe improves the third method mentioned above. In particular, although injection requires a pressure higher than atmospheric pressure, this pressure can be kept moderate by drilling the vent. In addition, this new method for sealing ensures the absence of any gas bubbles in the inter-seal volume.

Optionally, during injection and after the sealing product has exited the vent duct:

the vent duct is hermetically sealed; then the injection of sealing product is resumed under pressure in the inter-seal volume.

Also optionally, a depth of the vent duct drilling is estimated beforehand by measuring a depth of the leakage recovery duct using a gauge.

Also optionally, the vent duct is drilled using an automated drilling system based on the measured depth of the leakage recovery duct, this automated drilling system comprising a fixing template mounted on the junction with contact surface and counter-contact surface, and a drill chuck with a drill bit translationally mounted on the fixing template and moveable so as to drill the vent duct to the measured depth of the leakage recovery duct.

Also optionally, the sealing product comprises a polymerizable silicone composed at least of two products which react with one another to form a polymer which sets by polymerization, a diluent to fluidize the polymer and a reticulation accelerator, the mixing of these products and the injection of the resulting polymerizable silicone being carried out in less than one hour, the injection being carried out at a pressure greater than atmospheric pressure but less than or equal to 10 bars, preferably even less than or equal to 6 bars.

Also optionally, the sealing product comprises a silicone grease with silica microbeads, the injection being carried out at a pressure greater than atmospheric pressure but less than or equal to 15 bars, preferably even less than or equal to 10 bars.

Also optionally:

the compartment element of the gas-insulated substation is a pipe or pipe end through which electrical components pass in an insulating gas atmosphere, in particular a sulfur hexafluoride atmosphere;

the junction is a flange and counter-flange junction of this pipe or pipe end and comprises the two mechanical seals clamped between two flat contact surfaces of the flange and counter-flange respectively;

one of the two mechanical seals, known as the inner seal, being arranged inside a space delimited by the other of the two mechanical seals, known as the outer seal, so as to form the inter-seal volume, the method for sealing comprises the use of the leakage recovery duct which is arranged in at least one of the flange and the counter-flange; and the vent duct is drilled from the outside of the flange and counter-flange junction to the inter-seal volume.

Also optionally, the vent duct is drilled orthogonally to a lateral surface of at least one of the flange and the counter-flange, in a plane containing the outer seal, so as to drill the latter without drilling through the inner seal.

Also optionally:

the compartment element of the gas-insulated substation is a disconnecting switch; and the junction is a shaft and bore junction of this disconnecting switch and comprises the two mechanical seals clamped between two respective cylindrical contact surfaces of the shaft and the bore, the two mechanical seals being arranged at a distance from each other around the shaft so as to form the inter-seal volume, the method for sealing comprising the use of the leakage recovery duct which is arranged in the thickness of the compartment wherein the bore is formed.

A junction is also proposed with a contact surface and counter-contact surface of an element of a gas-insulated substation compartment, comprising:

two mechanical seals clamped between the contact surface and counter-contact surface, arranged to form a closed inter-seal volume delimited by the two mechanical seals and by the contact surface and counter-contact surface;

a sealing product injected under pressure into the inter-seal volume, using a leakage recovery duct arranged into the thickness of the compartment, this duct opening into the inter-seal volume; and a vent duct, different from the leakage recovery duct, drilled from the outside of the compartment to the inter-seal volume and filled with sealing product.

Figure 2:
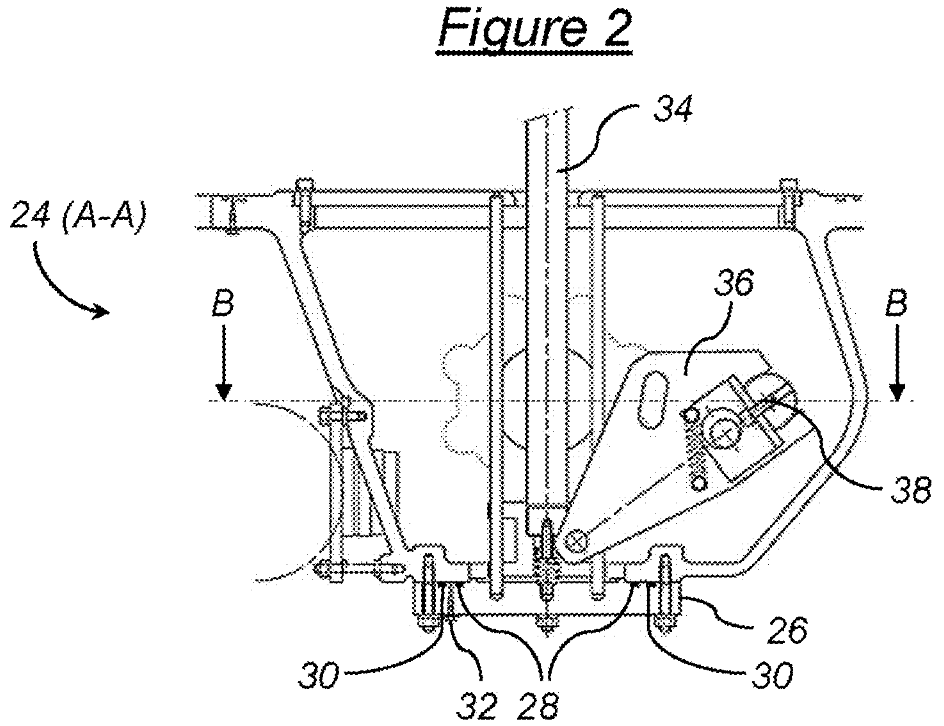
Figure 3:
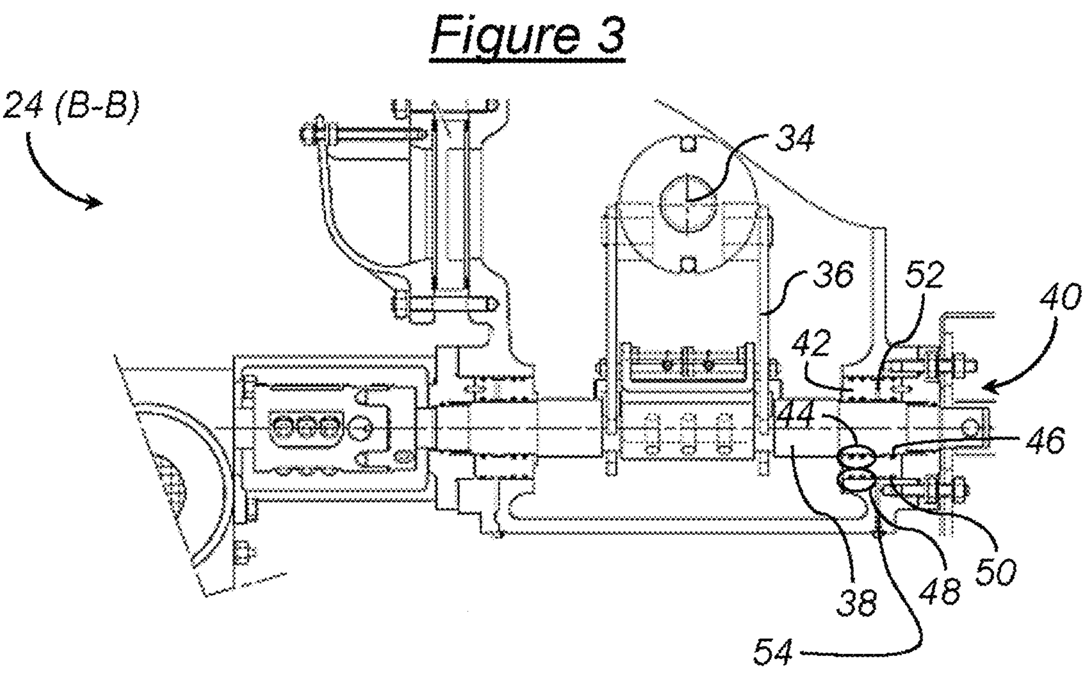
Figure 4:
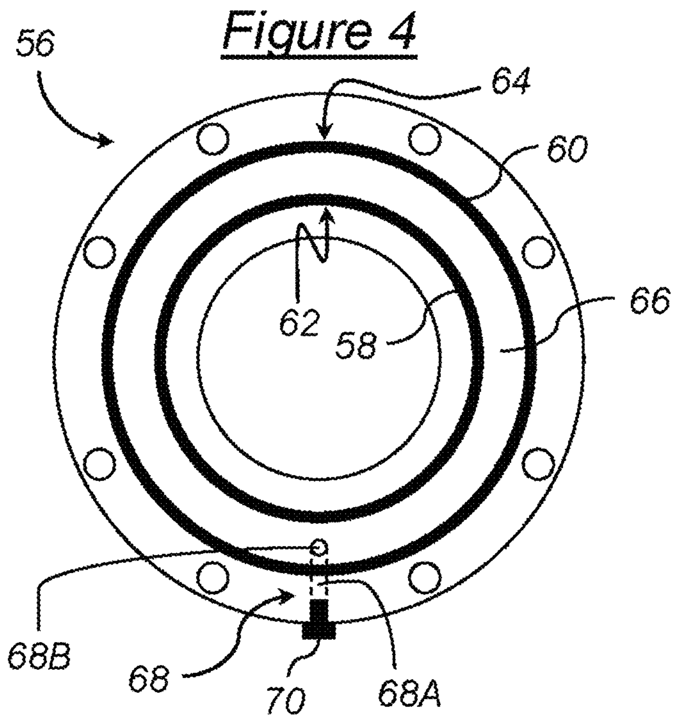
Figure 5:
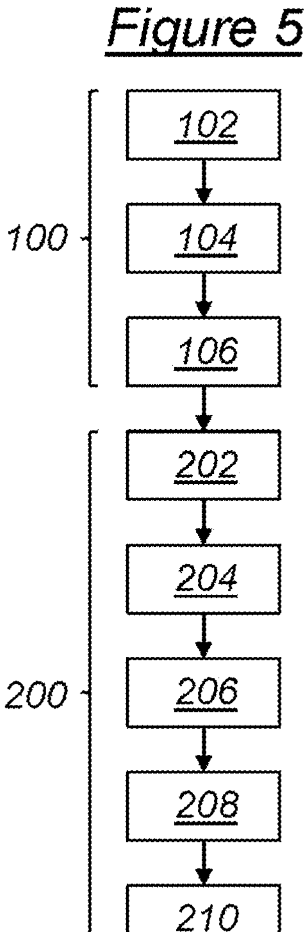
Figure 6:
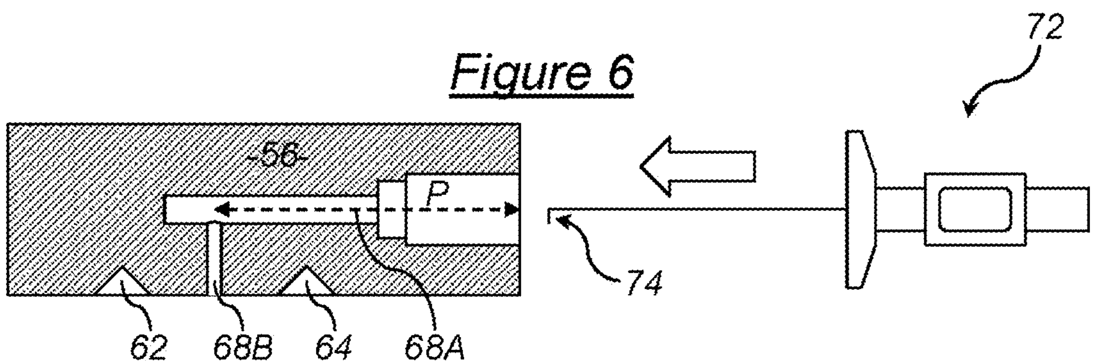
Figure 7:
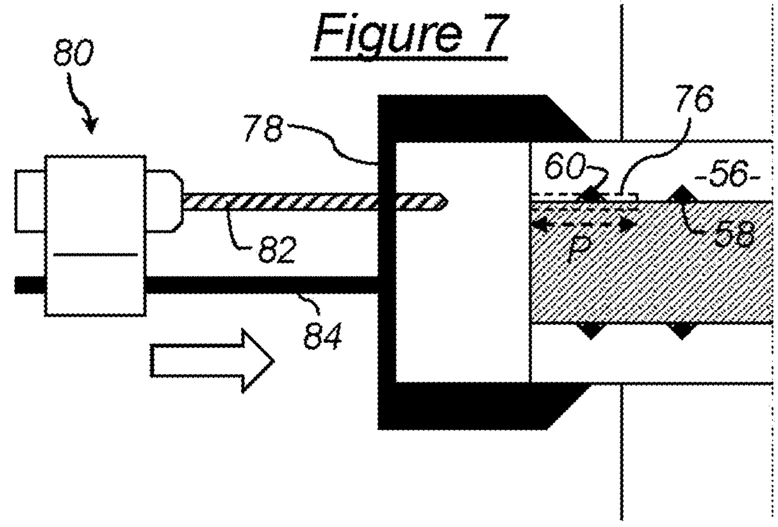
Figure 8:
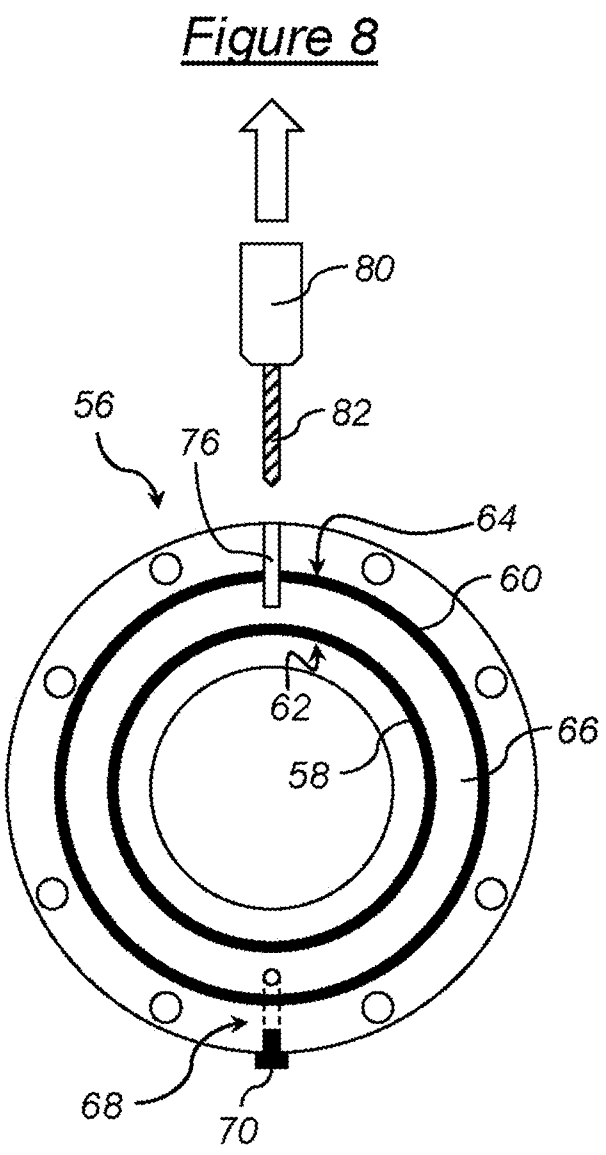
Figure 9:
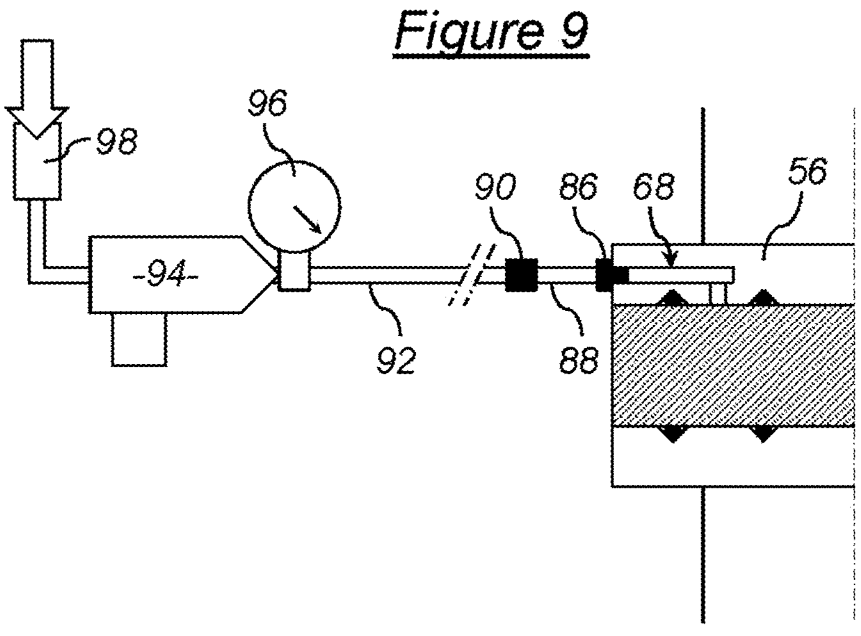
Figure 10:
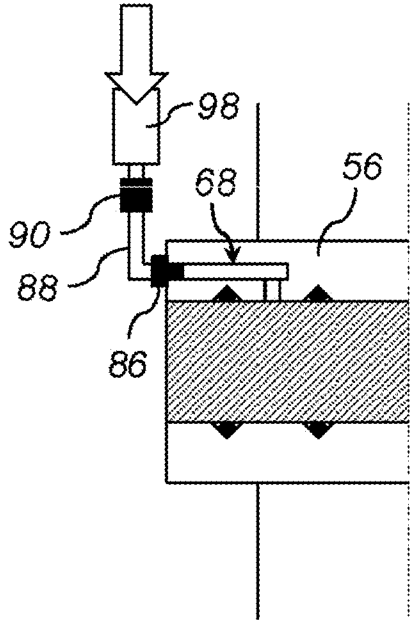
Figure 11:
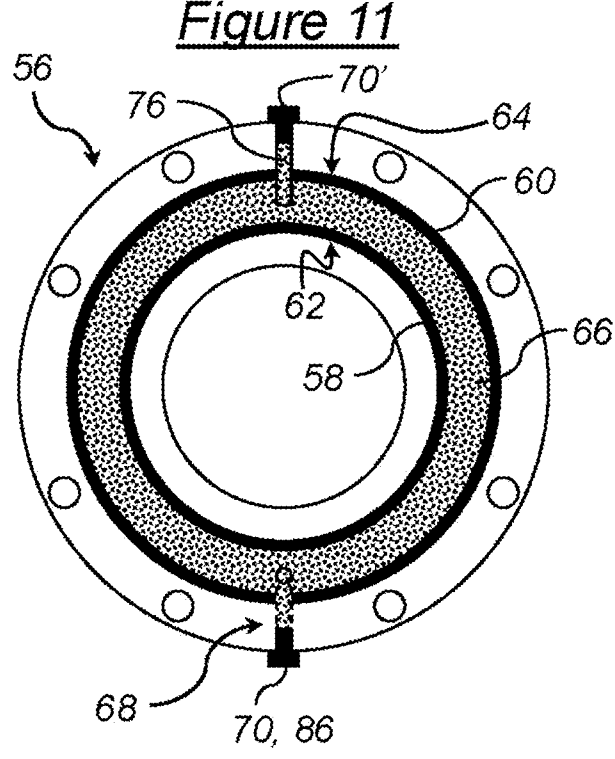

The invention will be better understood with the aid of the following description, given solely by way of example and with reference to the appended drawings wherein:

FIG. 1 shows schematically the general structure of a non-limiting example of a compartment of a gas-insulated substation (or GIS compartment) featuring several flanged and counter-flanged junctions of pipe sections or ends, FIG. 2 shows a schematic cross-sectional view of a disconnecting switch element of one of the pipe sections or ends of the GIS compartment shown in FIG. 1, FIG. 3 shows the disconnecting switch element of FIG. 2 in another cross-section showing a shaft and bore junction for this disconnecting switch, FIG. 4 shows a schematic front view of the flange, or counter-flange, of a flange and counter-flange junction of the GIS compartment shown in FIG. 1, FIG. 5 illustrates the successive steps of a method for sealing a junction with a contact surface and counter-contact surface of an element of the GIS compartment of FIG. 1, according to an embodiment of the invention, FIG. 6 illustrates the execution of a vent duct drilling depth measurement step in the method described in FIG. 5, FIG. 7 illustrates the execution of a vent duct drilling step in the method shown in FIG. 5, FIG. 8 shows the result of the drilling step in FIG. 7 on the flange or counter-flange in FIG. 4, FIG. 9 illustrates an injection step in the method described in FIG. 5, FIG. 10 illustrates the execution of an optional end-of-injection step of the method shown in FIG. 5, and FIG. 11 shows a schematic cross-section of the general structure of a non-limiting example of a junction with a contact surface and counter-contact surface of a GIS compartment element, according to one embodiment of the invention.

The installation shown in FIG. 1 comprises a pipeline containing a pressurized gas. This is a pipe in a gas-insulated substation compartment, in other words a GIS compartment, wherein cables or other electrical components are passed under an insulating gas atmosphere of sulfur hexafluoride.

By way of purely illustrative and non-limiting example, this pipe has a main branch 10, extending horizontally in FIG. 1, and a secondary branch 12 extending downwards from the main branch 10. In particular, it features various potential pressurized gas leakage zones, notably at the junctions of longitudinal connecting flanges of pipe sections, at the junctions of pipe section flanges or cylindrical tapping on pipe and rupture discs or density monitoring devices, or at the shaft and bore junctions formed in the GIS compartment. All these junctions feature mechanical seals not visible in FIG. 1, including at least a first mechanical seal, known as the inner seal, between the inside of the GIS compartment containing the pressurized gas and a closed inter-seal volume, and a second mechanical seal, known as the outer seal, between the closed inter-seal volume and the outside of the GIS compartment.

For example, the pipe shown in FIG. 1 has two zones, each of which contains two flanges for longitudinally connecting two pipe sections, which are clamped and hermetically screwed together, possibly by means of an insulating wafer. The first zone 14 is located in the main branch 10 and the second zone 16 is located in the secondary branch 12. Each comprises indeed a flange, a counter-flange and an insulating wafer interposed between the flange and the counter-flange.

The pipe further has a third zone 18 wherein a flange for cylindrical tapping on pipe and a disconnecting switch flange are clamped and hermetically screwed together, possibly by means of an insulating wafer. This third zone 18 is located in the main branch 10. It is flanged and counter-flanged, but is illustrated without an insulating wafer.

The pipe further has a fourth zone 20 wherein a pipe portion flange and a rupture disc or density monitoring device are clamped and hermetically screwed together, possibly by means of an insulating wafer. This fourth zone 20 is located at the free end of the secondary branch 12. It is flanged and counter-flanged, but shown without an insulating wafer.

The pipe further features a fifth zone 22 wherein a disconnecting switch drive shaft is inserted, free to rotate but hermetically sealed by means of mechanical seals, into a bore formed in the GIS compartment. This fifth zone 22 is located on the disconnecting switch, itself identified by reference 24, connected to the cylindrical tapping of the main branch 10. It is illustrated in detail in FIG. 2 according to a section A-A of the disconnecting switch 24 shown in FIG. 1.

Other potential leakage zones are present in the pipe illustrated in FIG. 1, such as the lower portion of the disconnecting switch 24, which has a rupture disc 26, but these will not be detailed here.

Each of the aforementioned zones 14, 16, 18, 20 and 22 constitutes a weak point in the pipe that is liable to leakage gas under pressure. This is indeed considered to be the case in the example shown in FIG. 1. As a result, each of these zones is provided with leakage recovery devices, in particular in the form of leakage recovery ducts arranged in the thickness of the GIS compartment.

When assembling the above-mentioned pipe elements, these ducts make it possible to check as the assembly progresses that the mechanical seals, which are clamped between these elements to be assembled so as to form the above-mentioned inter-seal volumes, are correctly fitted. In fact, by pressurizing each inter-seal volume with the corresponding leakage recovery system and using a spirit level to check that it remains pressurized, the correct installation of these mechanical seals can be verified and validated. Leakage recovery ducts generally have no other function, but can be advantageously reused for sealing after assembly.

Thus, in a manner known in the art, the flange and counter-flange of the first zone 14 each have a leakage recovery duct open on their outer cylindrical side wall and opening into a closed inter-seal volume delimited by two concentric mechanical seals, a contact surface of the flange (or respectively of the counter-flange) and a corresponding contact surface of the insulating wafer. The same applies to the flange and counter-flange of the second zone 16.

Also known in the art, the flange and counter-flange of the third zone 18 each have a leakage recovery duct open on their cylindrical side wall and opening into a closed inter-seal volume delimited by two concentric mechanical seals, a contact surface of the flange and a corresponding contact surface of the counter-flange. The same applies to the flange and counter-flange of the fourth zone 20.

Finally, also in a manner known in the art, the disconnecting switch 24 comprises at least two leakage recovery ducts open on its outer wall and each opening into a closed inter-seal volume delimited by two mechanical seals arranged at a distance from one another around the drive shaft and clamped between two respective cylindrical contact surfaces of the drive shaft and of the bore into which it is inserted.

Cross-section A-A of disconnecting switch 24, shown in FIG. 2, illustrates the configuration of rupture disc 26 more precisely. It is screwed against a corresponding contact surface at the bottom of disconnecting switch 24. To seal the junction, two concentric mechanical seals and, for example, O-ring seals are clamped between an upper face of the rupture disk and the contact surface of the disconnecting switch 24. The first of these two mechanical seals, forming an inner joint 28, is arranged inside the space delimited by the second of these two joints, forming an outer joint 30, so as to form a closed inter-seal volume. Access to this inter-seal volume is provided by a leakage recovery duct 32, closed in FIG. 2 by a knurled screw.

Section A-A of the disconnecting switch 24 shown in FIG. 2 also features a disconnecting rod 34 driven in vertical translation inside the GIS compartment by a cam 36, itself rotated by a drive shaft 38.

The drive shaft 38 and its integration in a bore 40 of the disconnecting switch 24 are detailed in FIG. 3 according to a section B-B shown in FIG. 2.

In the right-hand bore 40 of FIG. 3, the drive shaft 38 is fitted with a jointed ring 42. The latter has a cylindrical inner surface in contact with the cylindrical outer surface of drive shaft 38. The junction is sealed by means of two inner O-ring seals 44 arranged around the drive shaft 38 at a distance from an outer O-ring seal 46 of the same diameter also arranged around the drive shaft 38 so as to form a first inter-seal volume around the drive shaft 38.

The jointed ring 42 further has a cylindrical outer surface in contact with the cylindrical inner surface of bore 40. The junction is sealed by means of two inner O-ring seals 48 arranged around the jointed ring 42 at a distance from an outer O-ring seal 50 of the same diameter also arranged around the jointed ring 42 so as to form a second inter-seal volume around the jointed ring 42.

It should be noted that the two inter-seal volumes thus created against the inner and outer surfaces of the jointed ring 42 communicate with each other via at least one channel 52 cut into its thickness. Such a channel 52 can be seen in FIG. 3 at the top of the jointed ring 42. In addition, access to the second inter-seal volume is provided by a leakage recovery duct 54, closed in FIG. 3 by a knurled screw, cut into the wall thickness of the disconnecting switch 24.

It should also be noted that the drive shaft 38 is similarly integrated in another bore located on the left-hand side of FIG. 3. As the integration elements are the same by symmetry, they will not be detailed here.

The flange 56, or counter-flange, of a flange and counter-flange pipe junction is shown schematically in front view in FIG. 4. An O-ring seal sealing system is provided.

More precisely, two concentric 0-ring seals 58, 60 are arranged in two respective annular channels 62, 64 provided for this purpose in the contact face of the flange 56 (or counter-flange) to seal the contact with the corresponding counter-flange (or flange), or with the corresponding insulating wafer if applicable. The first smaller-diameter inner 0-ring seal 58, designed to provide a seal against pressurized gas inside the pipe, is arranged in the first smaller-diameter channel 62 cut into the contact face of the flange or counter-flange 56. The second larger-diameter external O-ring seal 60, designed to provide an external seal, in particular a raintight seal, is arranged in the second larger-diameter channel 64, also cut into the contact face of the flange or counter-flange 56. A closed inter-seal volume 66 is thus created between the contact face of the flange or counter-flange 56, the contact face of the corresponding counter-flange (or flange) or insulating wafer, the first inner O-ring seal 58 and the second outer O-ring seal 60.

Also known in the art, an "L"-shaped leakage recovery duct 68 is provided in the flange or counter-flange 56. A radial portion 68A of this duct passes through the thickness of the flange or counter-flange 56 from the cylindrical outer lateral surface of the flange to a depth between the first (58) and second (60) 0-ring seals. A transverse portion 68B of this duct, orthogonal to the plane shown in FIG. 4, extends inside the flange or counter-flange 56 orthogonally from the radial portion 68A towards the inter-seal volume 66. The L-shaped leakage recovery duct 68 thus connects the outside of the flange or counter-flange 56 to the inter-seal volume 66 without drilling the outer seal 60. In FIG. 4, it is shown closed by a knurled screw 70

A method for sealing a junction with contact surface and counter-contact surface of an element of the GIS compartment of FIG. 1 will now be described with reference to FIG. 5.

This method applies to the aforementioned junction between the lower part of the disconnecting switch 24 and the rupture disc 26, since this junction comprises two mechanical seals 28, 30 clamped between the contact surface and counter-contact surface, arranged so as to form a closed inter-seal volume reachable via a leakage recovery duct 32, as previously described with reference to FIG. 2.

It also applies to the aforementioned junction between the drive shaft 38 and the bore 40 via the jointed ring 42, since this junction comprises six mechanical seals 44, 46, 48, 50 clamped between the two pairs of contact surfaces and counter-contact surfaces, arranged so as to form two communicating and closed inter-seal volumes reachable via a leakage recovery duct 54, as previously described with reference to FIG. 3.

However, this method will be described in further detail for a flange and counter-flange junction such as, for example, any of the junctions in zones 14, 16, 18 and 20 of FIG. 1, which also have inter-seal volumes reachable via leakage recovery ducts, as described above with reference to FIG. 4. It can easily be generalized to the junctions in FIGS.

2 and 3, as well as to any junction with a closed inter-seal volume reachable via a leakage recovery duct.

A method for sealing according to the present invention also essentially comprises two phases. A first preliminary phase 100 for preparation and a second phase 200 for actual injection of sealing product.

In the preliminary phase 100, a vent duct other than the leakage recovery duct is drilled. In the example of flange or counter-flange 56, this is designed to be drilled through the thickness of the flange from the outside to the inter-seal volume. As the flange and counter-flange junction advantageously does not need to be dismantled before sealing, it is not always easy to know the depth of the hole. Even if this depth were known, it would probably not be very precise. However, the vent must be neither too short, as any residual gas would not be able to escape from the inter-seal volume, nor too long, as the internal pressure might no longer be contained by the inner seal 58 and the GIS compartment would start to leakage to atmospheric pressure. For this reason, the preliminary phase 100 can begin with an optional first step 102 to preliminary estimate an optimum drilling depth for the vent duct.

This preliminary step 102, a clever example of which is illustrated in FIG. 6, may involve measuring a depth P of the leakage recovery duct 68 using a gauge 72. In practice, given that the radial portion 68A of the leakage recovery duct 68 may extend inside the flange or counter-flange 56 beyond the transverse portion 68B, in particular to a depth close to or exceeding that of the first channel 62, it is advantageous to provide a bent tip 74 at the measuring end of the gauge 72. This bent tip 74 can be supported at the intersection of the radial 68A and transverse 68B duct portions, so that the measurement of the depth P, correctly located between those of the first 62 and second 64 channels, can be accurately measured as the optimum depth to be drilled for the vent duct.

The preliminary step 102 is followed by a drilling step 104, a clever example of which is shown in FIG. 7.

This drilling of the vent duct (shown in dotted line by reference 76 in FIG. 7) is carried out using an automated drilling system, with real-time control of the drilling depth, based on the measured depth P of the leakage recovery duct 68. The automated drilling system comprises a fixing template 78 mounted on the junction with a contact surface and counter-contact surface, and a drill chuck 80 with a drill bit 82 translationally mounted on a rail 84 of the fixing template 78 and movable so as to precisely drill the vent duct 76 to the measured depth P. Fixing template 78, for example, takes the form of a clamp, gripping the flange and counter-flange, integral with rail 84 mounted orthogonally to the cylindrical lateral surface of flange or counter-flange 56. The drill chuck 80 is mounted on the rail 84 in such a way that the drill bit 82 is in the plane of the two concentric mechanical seals 58 and 60.

Thus, when drilling the vent duct 76 shown as a dotted line in FIG. 7, the outer mechanical seal 60 is also drilled, without drilling the inner mechanical seal 58, provided that the depth P is correctly estimated. it is then easy to understand why preliminary step 102 is so important, as it ensures that the inner seal 58 is not reached when drilling.

In practice, vent duct 76 can be drilled to 3.3 mm in diameter and then M4 threaded or, if this is not sufficient to evacuate any gas present in inter-seal volume 66 during sealing product injection, to 4.2 mm in diameter and then M5 threaded.

The result of drilling 104 is shown in FIG. 8. The vent duct 76 is drilled in the plane of the contact surface of the flange or counter-flange 56, and the outer mechanical seal 60 is also drilled. Preferably, and wherever possible, vent duct 76 is diametrically opposed to leakage recovery duct 68, or at least sufficiently far away to allow good flow of the sealing product to be injected into the entire inter-seal volume 66.

The preliminary phase 100 ends with a step 106 for assembling a sealing product injection installation. A non-limiting example of such an installation is shown in FIG. 9.

During this assembly step 106, the knurled screw 70 is first removed from the leakage recovery duct 68 of the flange or counter-flange 56 and replaced by an element 86 for connecting a sealing product supply hose, for example a grease nipple with a non-return valve when the sealing product comprises a grease. In this case, it is advantageous to provide several grease nipples of different diameters to suit all possible configurations.

A first portion of supply hose 88, for example about ten centimeters long, is connected to element 86 and to another connecting element 90 at its other end. A second portion of supply hose 92, for example about one meter long or more, is connected to element 90 and to a motorized injector 94, for example an injection gun with sealing product cartridge(s), fitted at its injection end with a pressure gauge 96 for injection pressure control. Finally, the motorized injector 94 is connected to a compressor 98 which controls any variations in injection pressure.

The second phase 200 for actual injection of sealing product can then begin.

In a first step 202 of this second phase 200, the sealing product is prepared.

According to a first embodiment, the sealing product comprises a polymerizable silicone composed of at least two products which react with one another to form a polymer which sets by polymerization, a diluent to fluidize the polymer and a reticulation accelerator to counteract the increase in working time induced by the diluent. Such multi-component polymerizable silicones are commercially available, so the proportions to be respected will not be detailed, as they are generally indicated by the manufacturer.

The sealing product is prepared by mixing in this step 202, given that mixing of the aforementioned products as well as injection of the resulting polymerizable silicone must generally be completed in less than two hours, preferably less than one hour. As this polymerizable silicone is a thermosetting elastomer product, it is indeed associated with a relatively short working time. After this time, it begins its polymerization phase, which makes injection increasingly difficult, if not impossible.

As soon as the mixing is completed, the resulting polymerizable silicone is placed in a vacuum bell to eliminate any gas, then in an injection cartridge adapted for insertion into the motorized injector 94. Alternatively, and for faster and simpler operation, this mixing can be industrialized by preparing the products upstream (in volumes, proportions, weights, etc.) in different ready-to-use, degassed cartridges, with mixing only taking place during injection. This requires the use of a motorized injector 94 compatible with such a plurality of cartridges, which are mixed on injection. In addition, each cartridge can be conditioned to perform one or more injections depending on the injection conditions, in particular depending on the outside temperature. It should be noted that this variant does not require the use of a vacuum bell, and that preparation step 202 simply involves placing the ready-to-use cartridges in the motorized injector 94.

In a second embodiment, the sealing product comprises a grease, for example a silicone grease with silica microbeads, whose high viscosity enables it to fill leaks as it is injected into the inter-seal volume 66. Such greases are commercially available, so their composition will not be detailed, as it is generally indicated by the manufacturer.

The grease is placed in an injection cartridge suitable for insertion into the motorized injector 94. Alternatively, for faster and simpler operation, the grease is supplied in a ready-to-use cartridge. Preparation step 202 then simply involves placing the ready-to-use cartridge in the motorized injector 94.

In a second step 204 of the second phase 200, the sealing product is injected into the inter-seal volume 66 through the leakage recovery duct 68, using the installation assembled in step 106 and for instance illustrated in FIG. 9. This injection is carried out under pressure, in particular by successive pressures in cycles controlled by the compressor 98 and possibly controlled by the pressure gauge 96, until it fills the inter-seal volume 66 and then exits through the vent duct 76.

In view of the pre-drilled vent duct 76, the injection pressure is advantageously moderate. It may even be considered low in view of the GIS environment. For example, in accordance with the first embodiment, wherein the sealing product is a polymerizable silicone, injection is carried out at a pressure greater than atmospheric pressure, but less than or equal to 10 bars, preferably even less than or equal to 6 bars. For example too, in accordance with the second embodiment, wherein the sealing product is a grease of sufficient viscosity, injection is carried out at a pressure greater than atmospheric pressure but less than or equal to 15 bars, preferably even less than or equal to 10 bars.

At the end of step 204, it can already be assumed that no residual gas remains in the inter-seal volume 66.

In a subsequent step 206 of the second phase 200, the vent duct 66 is hermetically sealed. This can be achieved using a knurled screw, M4 or M5 depending on the drilling in vent duct 66, similar to knurled screw 70.

In a subsequent step 208 of the second phase 200, the sealing product is injected again under pressure into the inter-seal volume, still using the installation assembled in step 106 and under the same conditions as in step 204. Successive pressures can be applied according to an injection protocol involving several dozen injection cycles by the motorized injector 94, in particular around forty, in order to compress and increase the quantity of sealing product in the inter-seal volume 66 at a maximum pressure which nevertheless remains moderate and below the aforementioned ceilings.

At the end of the injection, particularly when the product is based on a polymerizable silicone, the first supply hose portion 88 is disconnected from the second portion 92 and directly connected to the compressor 98 using, for example, the connecting element 90. This first portion 88 is suspended vertically to ensure that no air makes its way to the injection point and that the polymerizable silicone remains in the inter-seal volume 66. The installation is then as shown in FIG. 10, and is left as it is for at least twelve hours to allow the polymerizable silicone time to set, under a controlled constant pressure of, say, 6 bars, before being dismantled.

If the outside temperature is below the range recommended by the manufacturer of the polymerizable silicone sealing product, it is advisable to install a heating blanket around the junction to allow polymerization to take place within the specified time.

Finally, in a last disassembly step 210, the installation shown in FIG. 9 or 10 is disassembled, with only the connecting elements 86, 90 and the first supply hose portion 88 possibly remaining, the latter forming a feeder for any possible future re-sealing.

Several configurations are possible at this stage:

everything is dismantled and the knurled screw 70 is reinserted into the leakage recovery duct 68, or only the connecting element 86 is retained, particularly in the case of a grease nipple with non-return valve, or the feeder is held in place by its two connecting elements 86, 90.

Since the first supply hose portion 88 is in fact optional, particularly when the sealing product is a grease, wherein the second supply hose portion 92 can then be directly connected to the leakage recovery duct 68 via the connecting element 86, it should be noted that the last two configurations enable immediate re-sealing if necessary, particularly in the event of a subsequent leakage. They also make it possible to identify that the junction in question has already been sealed. Finally, they enable the sealing product to be maintained under pressure in the inter-seal volume 66.

At the end of the method for sealing described above, the flange and counter-flange junction illustrated in FIGS. 4 to 10 is in the configuration shown schematically in FIG. 11.

It comprises two mechanical seals 58 and 60 clamped between the flange or counter-flange 56 and the other corresponding contact surface (respectively counter-flange or flange or insulating wafer), arranged so as to form the closed inter-seal volume 66 delimited by both of the mechanical seals 58, 60 and by the contact surface and counter-contact surface.

It further includes the sealing product, in particular polymerizable silicone or grease, which is injected under pressure into the inter-seal volume 66 using the leakage recovery duct 68 which opens into the inter-seal volume 66.

Finally, and according to the invention, it includes the vent duct 76, different from the leakage recovery duct 68, which is drilled from the outside to the inter-seal volume 66 and is also filled with sealing product, possibly under pressure. Note that vent duct 76 is plugged with a knurled screw 70' similar to knurled screw 70 of leakage recovery duct 68. The latter, in turn, is plugged using either the knurled screw 70 or the connecting element 86, particularly in the case of a non-return valve element.

This result visible on the flange and counter-flange junction shown in FIG. 11 can be generalized, as indicated above, to any junction with contact surface and counter-contact surface of a GIS compartment element comprising (at least) two mechanical seals clamped between the contact surface and counter-contact surface, arranged in such a way as to form a closed inter-seal volume delimited by two mechanical seals and by the contact surface and counter-contact surface, and a leakage recovery duct arranged in the thickness of the compartment to open into the inter-seal volume. In particular, it can be generalized to all the junctions referred to in FIGS. 1 to 3.

It clearly appears that a method for sealing such as the one described above enables internal sealing that is simple to implement, fast and effective, taking advantage of the presence of a leakage recovery duct and requiring no excessive injection pressure, while ensuring the absence of any residual gas bubbles in the inter-seal volume after sealing.

The following additional advantages can also be noted:

such a method can be implemented whenever a junction with a contact surface and counter-contact surface, with two mechanical seals clamped between the contact surface and counter-contact surface and with a leakage recovery duct opening into the inter-seal volume is leaking, whether or not the leakage is localized, the use of a polymerizable silicone or grease makes the sealing reversible without risk of damaging the junction, the final cost of such a sealing, in terms of reusable tools (gauge, automated drilling system, compressor, motorized injector, pressure gauge), consumables (cartridges, hoses and connecting elements) and labor, is much lower than what is proposed in the state of the art, insofar as this also makes it possible not to lock out the structure, so that it can continue to operate, the resulting sealing is just as effective over time (several years), it increases the service life of the assemblies concerned without the need for a major overhaul.

It should also be noted that the invention is not limited to the embodiments described above. Indeed, it will be apparent to the person skilled in the art that various modifications can be made to the embodiments described above, in the light of the teaching just disclosed. In the detailed presentation of the invention given above, the terms used should not be interpreted as limiting the invention to the embodiments set out in the present description, but should be interpreted to include all equivalents the anticipation of which is within the reach of the person skilled in the art by applying their general knowledge to the implementation of the teaching just disclosed to them.

The invention claimed is:

1. A method for sealing a junction with a contact surface and counter-contact surface of an element of a compartment of a gas-insulating substation, the junction comprising two mechanical seals clamped between the contact surface and the counter-contact surface, the two mechanical seals arranged so as to form a closed inter-seal volume therebetween such that the inter-seal volume is delimited by both of the two mechanical seals and by the contact surface and counter-contact surface, the method for sealing comprising an injection of a sealing product into the inter-seal volume using a leakage recovery duct arranged in a thickness of the compartment, this duct opening into the inter-seal volume, wherein:

prior to said injection, the method for sealing comprises drilling a vent duct different from the leakage recovery duct from an outside of the compartment into the inter-seal volume; and during said injection, the sealing product is injected under pressure into the inter-seal volume until the sealing product fills the inter-seal volume, then exits through the vent duct.

2. The method for sealing according to claim 1, wherein, during said injection and after the sealing product has exited through the vent duct:

the vent duct is hermetically sealed; then the injection of sealing product is resumed under pressure in the inter-seal volume.

3. The method for sealing according to claim 1, wherein a depth of the vent duct drilling is estimated beforehand by measuring a depth of the leakage recovery duct using a gauge.

4. The method for sealing according to claim 3, wherein the vent duct is drilled using an automated drilling system based on the measured depth of the leakage recovery duct, said automated drilling system comprising a fixing template mounted on the junction with contact surface and counter-contact surface and a drill chuck with a drill bit translationally mounted on the fixing template and moveable so as to drill the vent duct to the measured depth of the leakage recovery duct.

5. The method for sealing according to claim 1, wherein the sealing product comprises a polymerizable silicone composed at least of two products which react with one another to form a polymer which sets by polymerization, a diluent to fluidize the polymer and a reticulation accelerator, the mixing of said products and the injection of the resulting polymerizable silicone being carried out in less than an hour, the injection being carried out at a pressure greater than atmospheric pressure but less than or equal to 10 bars.

6. The method for sealing according to claim 1, wherein the sealing product comprises a silicone grease with silica microbeads, the injection being carried out at a pressure greater than atmospheric pressure but less than or equal to 15 bars.

7. The method for sealing according to claim 1, wherein:

the compartment element of the gas-insulated substation is a pipe or pipe end through which electrical components pass in an insulating gas atmosphere;

the junction is a flange and counter-flange junction of said pipe or pipe end and comprises the two mechanical seals clamped between two flat contact surfaces of the flange and counter-flange respectively;

one of the two mechanical seals, forming an inner seal, being arranged inside a space delimited by the other of the two mechanical seals, forming an outer seal, so as to form the inter-seal volume, the method for sealing comprises using the leakage recovery duct which is arranged in at least one of the flange and the counter-flange; and the vent duct is drilled from the outside of the flange and counter-flange junction to the inter-seal volume.

8. The method for sealing according to claim 7, wherein the vent duct is drilled orthogonally to a lateral surface of at least one of the flange and the counter-flange, in a plane containing the outer seal, so as to drill the latter without drilling the inner seal.

9. The method for sealing according to claim 1, wherein:

the compartment element of the gas-insulated substation is a disconnecting switch; and the junction is a shaft and bore junction of the disconnecting switch and comprises the two mechanical seals clamped between two respective cylindrical contact surfaces of the shaft and the bore, the two mechanical seals being arranged at a distance from each other around the shaft so as to form the inter-seal volume, the method for sealing comprising using the leakage recovery duct which is arranged in the thickness of the compartment wherein the bore is formed.

10. The method for sealing according to claim 5, wherein the injection is carried out at a pressure less than or equal to 6 bars.

11. The method for sealing according to claim 6, wherein the injection is carried out at a pressure less than or equal to 10 bars.

12. The method for sealing according to claim 7, wherein the insulating gas atmosphere is a sulfur hexafluoride atmosphere.

13. The method for sealing according to claim 1, wherein the junction including the two mechanical seals and the inter-seal volume with the leakage recovery duct opening thereto is assembled before the injection of the sealing product into the inter-seal volume.

14. The method for sealing according to claim 1, wherein one of the two mechanical seals forms an inner seal arranged inside a space delimited by the other of the two mechanical seals which forms an outer seal, so as to form the inter-seal volume therebetween.

15. A junction with contact surface and counter-contact surface of an element of a gas-insulated substation compartment, comprising:

two mechanical seals clamped between the contact surface and counter-contact surface, the two mechanical seals arranged to form a closed inter-seal volume therebetween that is delimited by the two mechanical seals and by the contact surface and counter-contact surface;

a sealing product injected under pressure into the inter-seal volume using a leakage recovery duct arranged into a thickness of the compartment, the leakage recovery duct opening out into the inter-seal volume, and a vent duct, different from the leakage recovery duct, drilled from an outside of the compartment to the inter-seal volume and filled with sealing product.

16. The junction according to claim 15, wherein one of the two mechanical seals forms an inner seal arranged inside a space delimited by the other of the two mechanical seals which forms an outer seal, so as to form the inter-seal volume therebetween.

* * * * *